March 29, 1938.   W. S. PROUDFIT   2,112,449
PHOTOGRAPHIC COPYING STAND
Filed Dec. 3, 1936
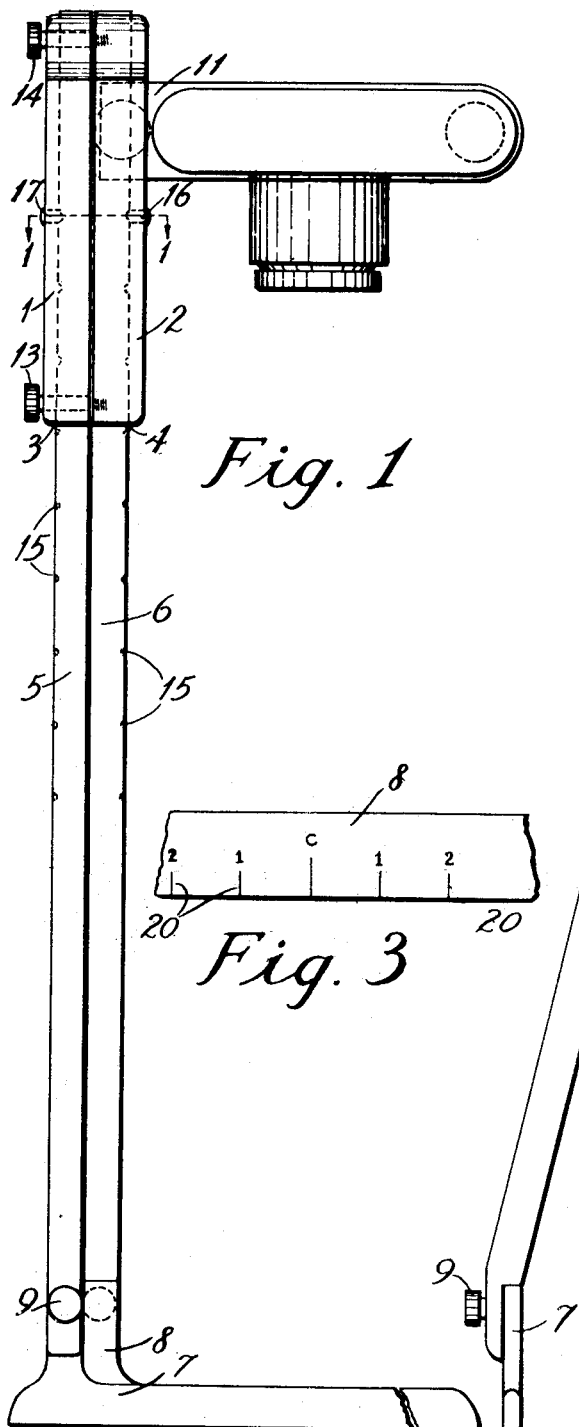
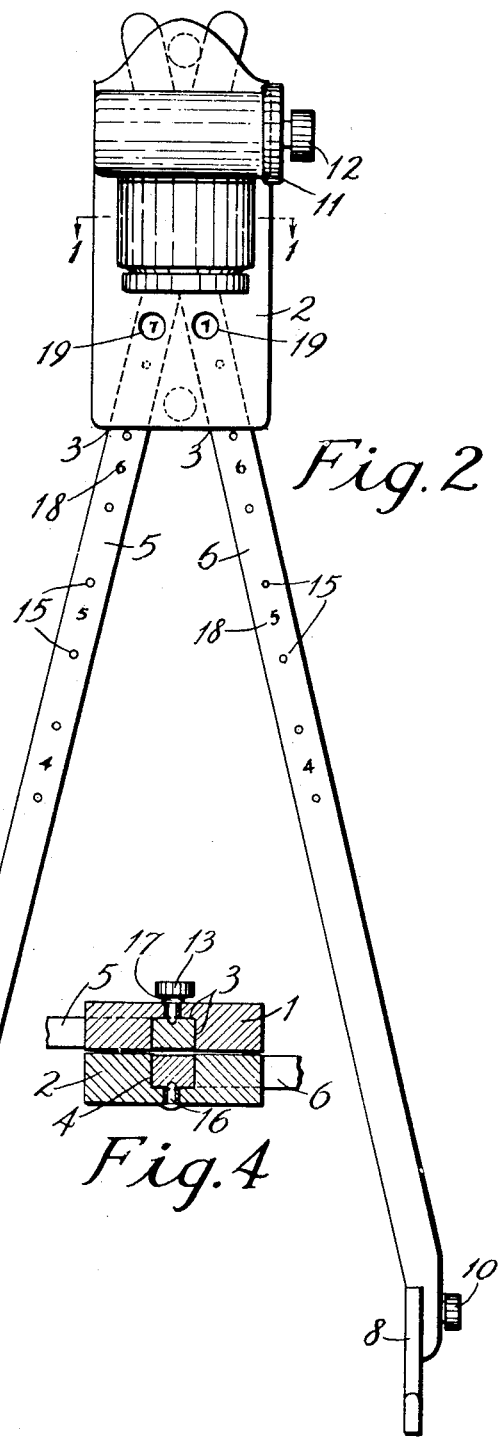
INVENTOR.
William Sayre Proudfit Patented Mar. 29, 1938

2,112,449

UNITED STATES PATENT OFFICE 2,112,449

PHOTOGRAPHIC COPYING STAND

William Sayre Proudfit, Lincoln, Nebr.

Application December 3, 1936, Serial No. 114,016

4 Claims. (Cl. 88—24)

My invention relates to photographic copying stands which support a camera over or facing an area or object to be photographed, and which space the camera at the proper distance to include on the negative the area desired. My invention more particularly relates to adjustable photographic copying stands which form in combination with the camera a portable unit which may be set on pages of books, maps, or other flat copy, and which serve to indicate the area in the field of view of the camera, and to hold the copy flat.

Adjustable stands of this nature have been devised, but, to my knowledge, none of them is so constructed that by a single adjustment of the standard or standards which support the camera, the proper relationship between camera distance and size of object area, as indicated by the base portion of the stand, is obtained.

My invention embodies a construction which utilizes the principle, well known to those skilled in the art of photography, that any given combination of negative dimension and focal length in a lens subtends a fixed angle of view, which is the same at all distances between the lens and infinity object distance. A camera using a rectangular negative will photograph a rectangular field, and the field of view extends from the lens to infinity in the form of a rectangular pyramid with the lens above the apex. If the camera is supported on a bracket which slidably carries a standard extending parallel to each of two opposite sides of this pyramidal field of view, and if a straight base member is attached to the end of each standard, parallel to the side of the pyramid and to the film plane, then by increasing the length of the two standards equally, the base members simultaneously move apart and bound on two sides a larger object area which is within the field of view of the camera.

My invention comprises in combination, a bracket on which is detachably supported a camera with its optical axis parallel to a plane of the bracket; two guides attached to or integral with said bracket, and parallel to said plane of the bracket, said guides adjustable to each other at an angle substantially equal to the angle of view of the camera parallel to aforementioned plane of the bracket; standards adjustably held by said guides; base members provided at the lower extremities of said standards, said base members when in use resting parallel to the film or plate plane, and serving to define the object area on opposite sides and at right angles to aforementioned plane of the bracket at any desired distance from the camera within the range of the device; calibrations on said standards for obtaining any desired dimension of the object plane between said base members by adjusting the length of said standards between the bracket and base members; and suitable means for holding the aforementioned parts in the desired relationship. This combination of parts provides a simple and efficient stand, making it possible to obtain simultaneously a change in the object area indicated by the base members and the correct photographic camera distance from said area by a single adjustment of the standards in the guides.

The objects of my invention are: first, to provide a photographic copying stand of the character described which will support a camera at the correct distance from the object plane to include substantially the area to be photographed, at any adjustment within the range of the device; second, to provide simple means for defining said area; third, to provide means for supporting the camera in such position that the optical axis of the lens is always at right angles to the center of said area to be photographed; fourth, to provide a photographic copying stand in which the standards can be adjusted in a single direction in such a manner that the base members are set at a preselected distance apart, said adjustment coordinately setting the correct photographic distance between the camera and the object plane to be photographed; and fifth, to provide a photographic copying stand of the character described, which forms an independent, portable unit that attains the aforementioned objects.

I attain these objects by the mechanism illustrated in the accompanying drawing in which:

Figure 1 is a front elevation of a copying stand embodying the invention, showing the device adjusted to its extreme extension, and showing the placement of the camera in relation to the device.

Figure 2 is a side elevation of the device in the same adjustment, with a camera attached.

Figure 3 is an elevation of a portion of one of the base members, showing the calibrations on the inner face.

Figure 4 is a sectional view of the bracket taken at line 1—1, Figs. 1 and 2.

Similar numerals refer to similar parts throughout the several views.

Referring more specifically to the drawing, 1 and 2 are plates in abutment which together form a bracket. From the inner face of each of said plates 1 and 2, Fig. 4, are machined guides 3 and 4 respectively, extending diagonally throughout the length of said plates 1 and 2. Standards 5 and 6 fit slidably respectively in said guides 3 and 4. At the lower extremities of standards 5 and 6 are attached respectively base members 7 and 8, parallel to each other and at right angles to their respective standards 5 and 6. The camera for which the stand is designed is attached to the bracket in such a manner that its film plane is parallel to the plane bounded on opposite sides by the base members 7 and 8, and its optical axis intersects said plane at its center. One method by which said camera can be attached to the bracket is illustrated in the accompanying drawing, in which side-arm 11, Figs. 1 and 2, is attached to portion 2 of the aforementioned bracket by suitable means. The camera may be attached to said side-arm 11 by a set screw 12 passing through said side-arm 11 into the tripod socket on the camera.

The width of the area to be photographed is measured. The standards 5 and 6 are then adjusted to the proper length to separate the base members to this desired distance. This is accomplished by sliding standards 5 and 6 in guides 3 and 4 until the numbers on said standards 5 and 6 corresponding to the desired object width show in openings 19. At this adjustment the ball stops 16 and 17 will engage the proper depressions 15 in the standards 5 and 6 to provide precise adjustment of standard length. When said adjustment has been made the camera is at the proper height to photograph the desired area. Calibrations 20, Fig. 3, on the inner faces of base members 7 and 8 are provided to align the stand on the copy in the dimension parallel to the base members.

While the device is planned primarily for use as a vertical copying stand it may readily be seen that it lends itself to use as a hand held view finding device for small areas, or may be set in a horizontal position or at any desired angle.

Various changes in the details of construction may be made without departing from the spirit or scope of the invention as defined by the claims.

I claim:

1. In a photographic copying stand, in combination, a pair of supporting standards, a camera supporting bracket to which said standards are adjustably attached, a base member attached to the lower extremity of each standard, said base members placed parallel to each other and to the film plane of the camera to be held by the stand, means for attaching a camera to said bracket with the optical axis of the camera intersecting the mid-point of the area bounded on opposite sides by said base members, guides integral with or attached to said bracket, and adjustably fixed at an angle to each other substantially equal to the angle of view of said camera in their plane, aforementioned standards being held adjustably in said guides.

2. In a photographic copying stand, in combination, a camera supporting bracket, means for attaching a camera with its optical axis parallel to a plane of the bracket, two guides attached to or integral with said bracket parallel to aforementioned plane of the bracket, means for adjustably fixing said guides at an angle to each other substantially equal to the angle of view of the camera in aforementioned plane of the bracket when the bisector of said angle of the guides parallels the optical axis of the camera, a standard adjustably held in each of said guides, a base member attached to the lower extremity of each standard, each of said base members defining an opposite side of the object area parallel to the negative plane, and corresponding graduations on each standard which indicate the proper setting of said standards to obtain a selected separation between said base members.

3. In a photographic copying stand, in combination, two plates in abutment forming a bracket, means provided for attaching a camera to said bracket, means for adjustably holding together said plates of the bracket, a guide formed in each of said plates of the bracket, a standard held adjustably in each of said guides, said standards being disposed at an angle to each other equal to the angle of view of said camera in the plane of the standards, a base member provided at the lower extremity of each of said standards, said base members being placed parallel to each other and to the film plane of said camera, in such position that the optical axis of the camera intersects the mid-point of the area bounded on opposite sides by said base members.

4. In a stand as claimed in claim 3, graduations on the standards at calculated intervals, said graduations serving to indicate the setting of said standards to obtain a desired separation between the base members attached to the lower extremities of said standards, and openings in the bracket through which said calibrations on the standards can be seen.

WILLIAM SAYRE PROUDFIT.